(12) United States Patent
Hayashi (10) Patent No.: US 6,472,623 B1
(45) Date of Patent: Oct. 29, 2002

(54) TURN SIGNAL CANCEL DEVICE

(75) Inventor: Hirofumi Hayashi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 45 days.

(21) Appl. No.: 09/709,522

(22) Filed: Nov. 13, 2000

(30) Foreign Application Priority Data

Nov. 18, 1999 (JP) ............................................ 11-328168

(51) Int. Cl.⁷ .............................. H01H 3/16; B60Q 1/40
(52) U.S. Cl. ................ 200/61.27; 200/61.3; 200/61.31; 200/61.35
(58) Field of Search .......................... 200/61.27–61.38, 200/61.54; 340/476

(56) References Cited

U.S. PATENT DOCUMENTS

| | | | | |
|---|---|---|---|---|
| 4,335,284 A | * | 6/1982 | Ochiai et al. ............. | 200/61.27 |
| 4,426,951 A | * | 1/1984 | Nishizima ............. | 200/61.35 X |
| 4,570,041 A | * | 2/1986 | Ishiguro ................. | 200/61.34 |
| 4,647,736 A | * | 3/1987 | Furuhashi et al. ........ | 200/61.27 |
| 4,739,131 A | * | 4/1988 | Maeda ..................... | 200/61.27 |
| 4,855,542 A | * | 8/1989 | Furuhashi et al. ........ | 200/61.27 |
| 4,859,816 A | * | 8/1989 | Tanaka ..................... | 200/61.27 |
| 5,030,802 A | * | 7/1991 | Noro ........................ | 200/61.27 |
| 5,406,253 A | * | 4/1995 | Doke et al. ............... | 200/61.27 |
| 5,646,384 A | * | 7/1997 | Noro et al. ................ | 200/61.3 |
| 5,672,855 A | * | 9/1997 | Uchiyama et al. ......... | 200/61.3 |
| 5,808,546 A | * | 9/1998 | Hayase et al. ........... | 200/61.27 |
| 6,186,022 B1 | * | 2/2001 | Ishikawa ................... | 200/61.3 |

\* cited by examiner

*Primary Examiner*—J. R. Scott
(74) *Attorney, Agent, or Firm*—Morgan, Lewis & Bockius LLP (57) ABSTRACT

A canceling ratchet consists of ratchet body portion 31, ratchet movable portion 32 enabled to move in a forward and backward direction in ratchet body portion 31, and a movable portion pushing spring 40 provided between these portions. When a grabby brake phenomenon occurs in turn lever 24, ratchet movable portion 32 moves in direction of arrow G1 against a spring force of movable portion pushing spring 40. When a cancel operation is performed, the direction of vector F1 differs by nearly 90 degrees from the direction of movement of ratchet movable portion 32, and from the direction of expansion and contraction of movable portion pushing spring 40. Thus, the magnitude of a vector F4 representing a force acting on movable portion spring 40 is relatively small, exerting a small influence on the movable portion pushing spring.

3 Claims, 9 Drawing Sheets

TURN SIGNAL CANCEL DEVICE

BACKGROUND OF THE INVENTION

1. Technical Field

The present invention relates to a turn signal cancel device adapted to automatically return a turn lever, which has been turned to a left turn indicating position or to a right turn indicating position, to a neutral position according to the fact that a steering wheel is rotated in a direction opposite to the direction indicated by the turn lever.

2. Related Art

Figure 8:
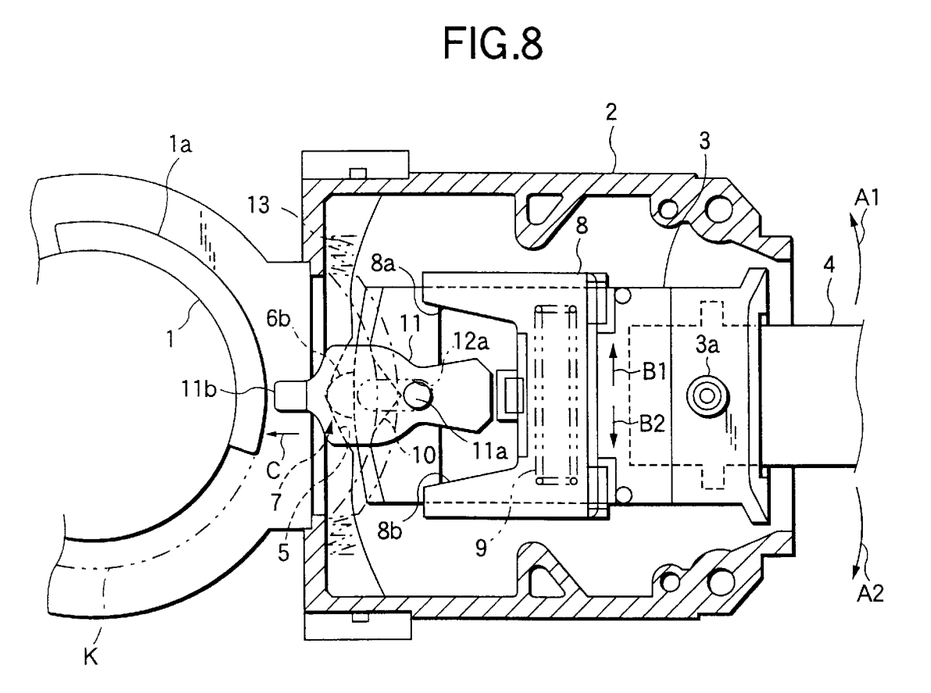
FIG. 8 is a diagram corresponding to FIG. 2, which illustrates a related turn signal cancel device.
Figure 9:
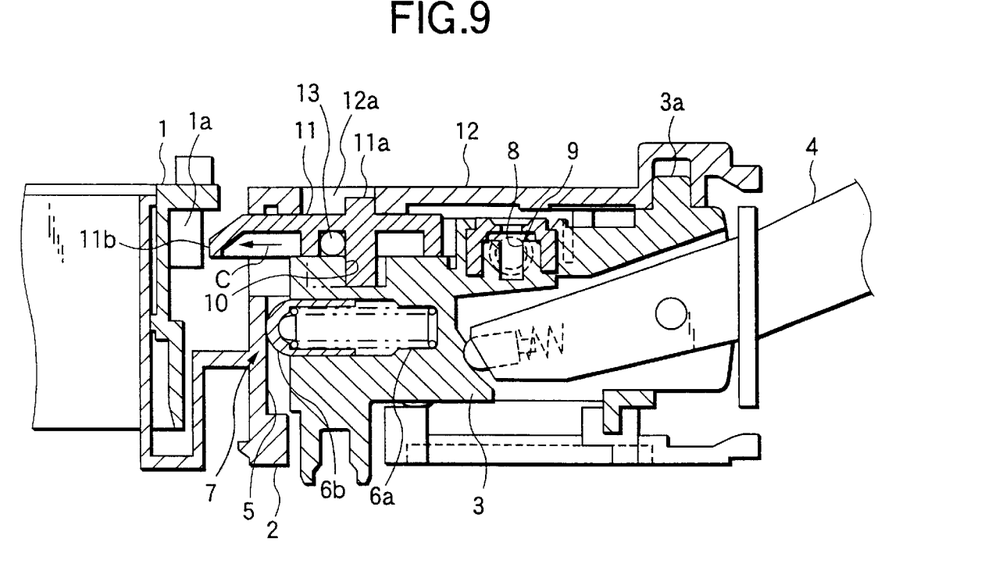
FIG. 9 is a longitudinal sectional diagram illustrating the related device.

The configuration of a related turn signal cancel device of such a kind is described hereinafter with reference to FIGS. 8 to 12. As shown in FIGS. 8 and 9, a cancel cam 1 is a cylindrically shaped member, which has a cancel convex portion 1a on the outer peripheral portion thereof, and adapted to be integrally rotated with a steering wheel (not shown).

A rectangular box body 2 having opening portions at both lateral end portions is provided in a fixed manner on the right side of this cancel cam 1. A bracket 3 is provided in the body 2 in such a way as to able to rotate around a shaft portion 3a. A base portion of a turn lever 4 is connected to the bracket 3. A moderation surface portion 5 having alternate formed ridge portions and valley portions is provided on the left-hand inner surface of the body 2. A moderation piece 6b is provided at the end portion of the bracket 3 and is pushed by a moderation spring 6a in a direction which the moderation piece 6b is press-contacted with the moderation portion 5. A moderation mechanism 7 includes the moderation surface portion 5, the moderation spring 6a, and the moderation piece 6b.

The bracket 3 and the turn lever 4 are held selectively at a neutral position, a left turn indicating position (see FIG. 10) to which the turn lever 4 is turned therefrom in a direction of an arrow A1, and a right turn indicating position (not shown) to which the turn lever 4 is turned therefrom in a direction of an arrow A2 whose direction is opposite to the direction of the arrow A1, as illustrated in FIGS. 8 and 9. Incidentally, although not shown, a turn signal switch, whose contacts are switched according to the position of the bracket 3, is provided in the body 2.

A back plate 8 is nearly U-shaped as a whole, and includes pressed portions 8a and 8b at both end portions thereof. The back plate is attached onto a nearly central part of the top surface portion of the bracket 3 in such a manner as to be able to slide in the directions of arrows B1 and B2. A back-plate holding spring 9 for holding the back plate 8 at an intermediate position illustrated in FIG. 8 by a predetermined force is provided between the back plate 8 and the bracket 3. A cam portion 10 having a crest part is provided on a left-hand side portion of the top surface of the bracket 3.

A ratchet 11 is disposed in the top surface portion of the bracket 3. A shaft portion 11a is provided on the middle portion of the ratchet 11 so that the top end of the shaft portion 11a is inserted into a guide hole 12a, which is an elongated hole formed in a cover 12 (see FIG. 9) attached to the top surface portion of the body 2 in such a manner as to be able to move and rotate, and so that the bottom part of the shaft portion 11a moves along the cam portion 10. The ratchet 11 is pushed by a ratchet pushing spring 13 in a direction of an arrow C, that is, to the side of the cancel cam 1.

In a state in which the bracket 3 (thus, the turn lever 4) is placed at the neutral position illustrated in FIG. 8 in the aforementioned configuration, the bottom part of the shaft portion 11a of the ratchet 11 is placed at the top of the crest part of the cam portion 10. The ratchet 11 is held at a position where the leading end portion 11b thereof retreats from a rotational locus K (see the position indicated by a chain double-dashed line in FIG. 8) of a cancel convex portion 1a.

Figure 10:
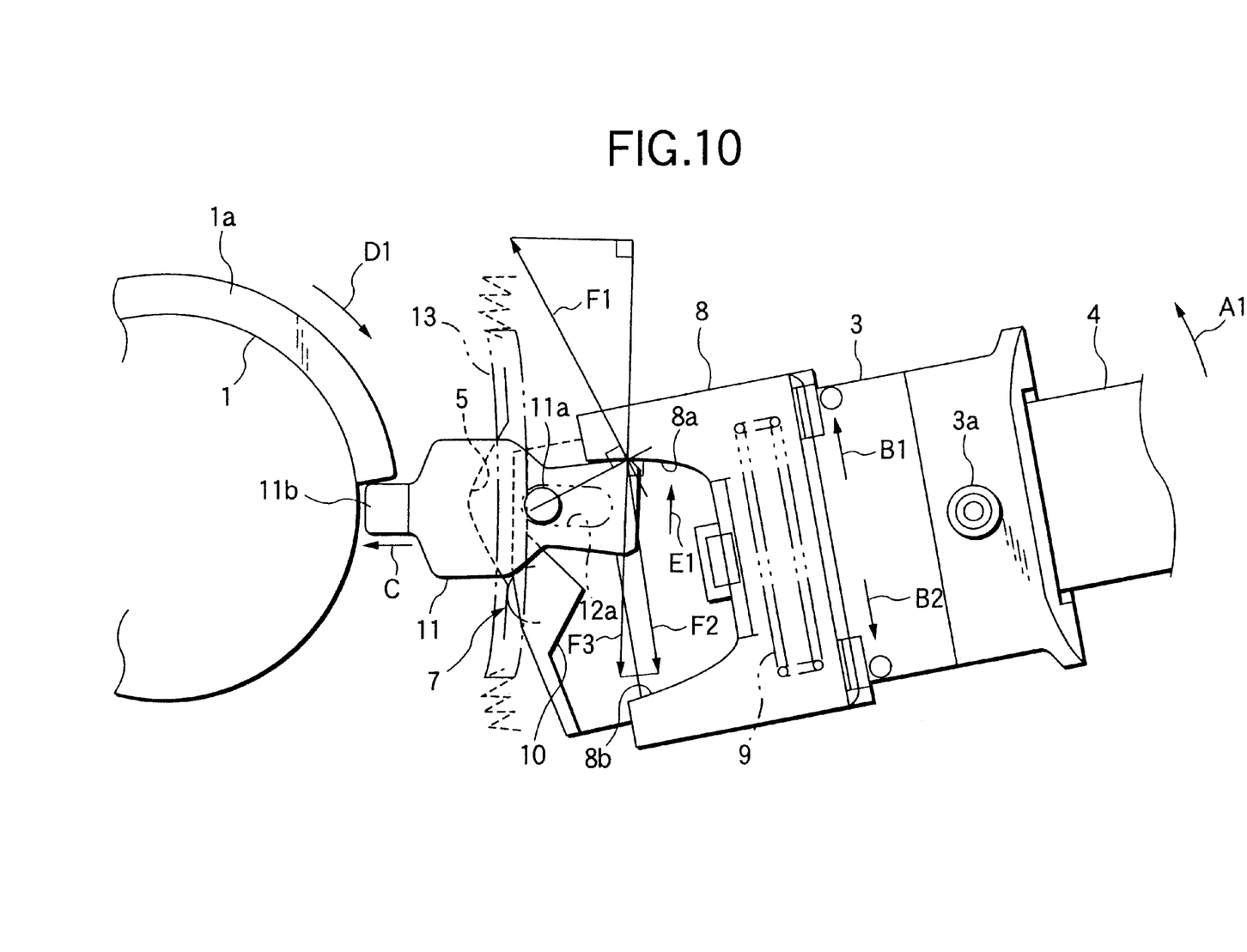
FIG. 10 is a diagram corresponding to FIG. 1.

When the turn lever 4 is turned from the neutral position thereof in the direction of, for instance, the arrow A1, and the bracket 3 is placed at the left turn indicating position illustrated in FIG. 10, the ratchet 11 is caused by the pushing force of the ratchet pushing spring 13 to frontwardly move in the direction of the arrow C during the bottom part of the shaft portion 11a moves along a slope of the cam portion 10. Then, the ratchet 11 is put into a state in which the leading end portion 11b thereof moves inside the rotational lotus K of the cancel convex portion 1a.

When the cancel cam 1 is turned in the direction of the arrow D1 opposed to the indicated direction of the bracket 3 by the steering wheel during this state, the leading end portion 11b of the ratchet 11 is pushed in the same direction, so that the ratchet 11 is turned around the shaft portion 11a in the direction of an arrow E, and that the rear end thereof pushes the pressed portion 8a of the back plate 8. In the case that this pushing force exceeds the holding force of the moderation mechanism 7, the bracket 3 (thus, the turn lever 4) is turned and returned to the neutral position.

Figure 11:
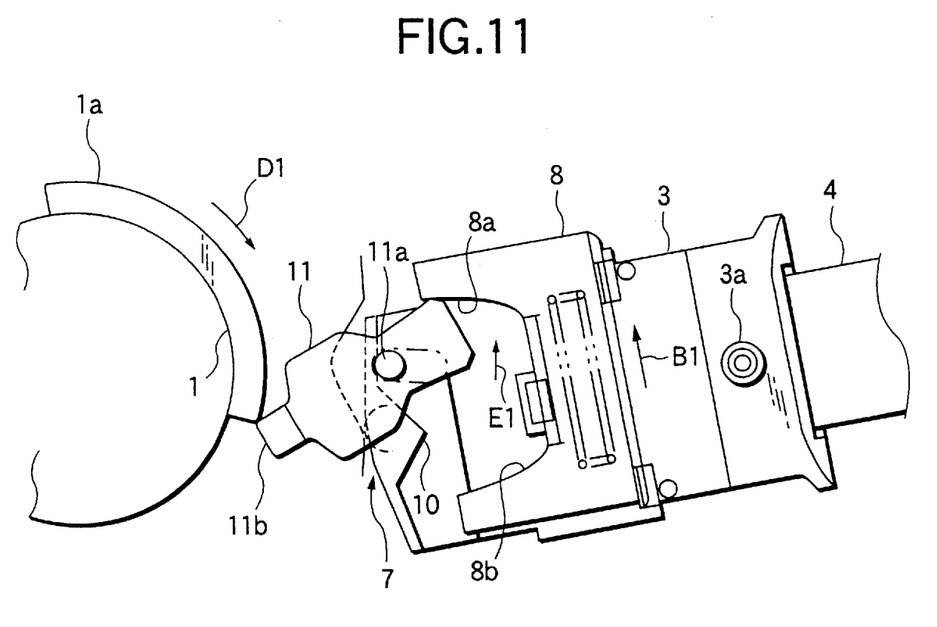
FIG. 11 is a diagram corresponding to FIG. 6.

In the case that a phenomenon of what is called a grabby brake occurs, for example, the turn lever 4 is held by a driver at the left turn indicating position when the cancel operation is performed, an excessive pushing force 8a, which exceeds the holding force of the back-plate holding spring 9, of the back plate 8 acts on the pressed portion 8a of the back plate 8 from the rear end portion of the ratchet 11. Then, as illustrated in FIG. 11, the back plate 8 moves in the direction of the arrow B1. This permits the cancel convex portion 1a to pass therethrough in the direction of an arrow D1. Consequently, the ratchet 11 and the back plate 8 are prevented from being damaged when the phenomena of grabby brakes occur.

Incidentally, although the aforementioned operation is performed when the bracket 3 (thus, the turn lever 4) is turned to the left turn indicating position, a similar operation is performed when the bracket 3 (thus, the turn lever 4) is turned to the right turn indicating position.

However, the related cancel device has the following problem. That is, let F1 denote a vector representing the pushing force transmitted from the ratchet 11 to the back plate 8 when the cancel operation is performed as illustrated in FIG. 10. In this case, a vector F2 representing the force acting on the back-plate holding spring 9 is established as illustrated in FIG. 10. A vector F3 is a vector representing a vertical reaction force transmitted from the back plate 8 to the ratchet 11. In this case, the direction of the vector F1 representing the pushing force transmitted from the back plate 8 to the ratchet 11 is close to the direction of expansion and contraction of the back-plate holding spring 9 (that is, the direction of the arrow B1 or B2, in which the back plate 8 moves). Thus, when the cancel operation is performed, the vector F2 acting on the back-plate holding spring 9 has a large magnitude and exerts a large influence on the back-plate holding spring 9.

Figure 12:
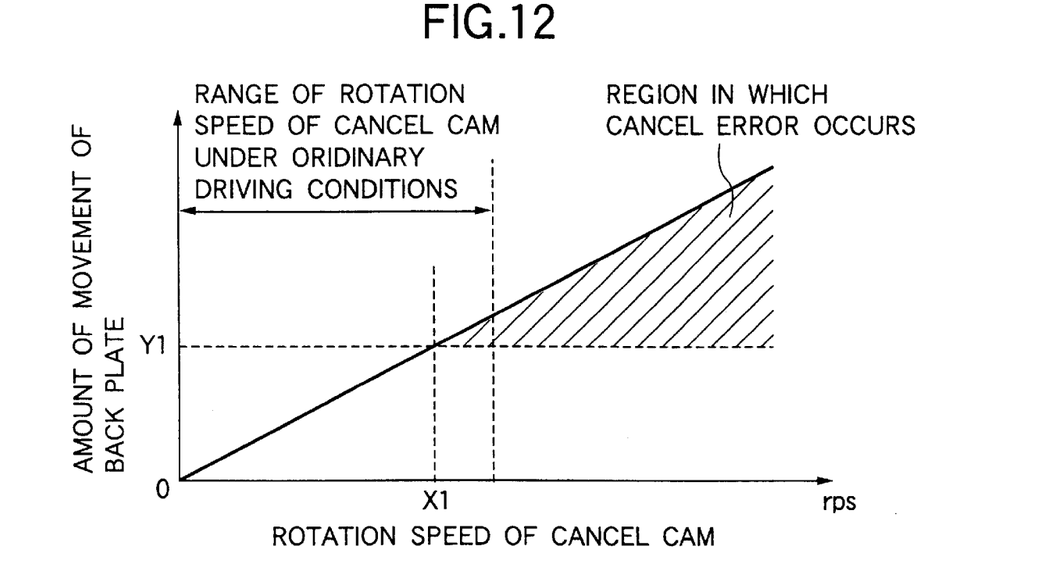
FIG. 12 is a diagram corresponding to FIG. 7.

Thus, even when the cancel operation is performed at the rotational speed of the steering wheel (or of the cancel cam) under ordinary driving conditions, the back plate 8 easily moves. Therefore, as illustrated in FIG. 12, an amount of movement of the back plate 8 increases with increase in the rotational speed of the cancel cam 1 (or of the steering wheel) Consequently, a cancel error (that is, even when the ratchet 11 is turned by the cancel convex portion 1a, the bracket 3 is not returned to the neutral position thereof) easily occurs.

SUMMARY OF THE INVENTION

The present invention is accomplished in view of such circumstances. Accordingly, an object of the present invention is to provide a turn signal cancel device, which has a function of avoiding occurrences of phenomena of grabby brakes in a turn lever, and which can prevent occurrences of cancel errors as much as possible.

To achieve the foregoing object, according to the present invention, there is provided a turn signal cancel device that includes:

a cancel cam having a cancel convex portion defining a rotational locus adapted to be rotated by a steering wheel;

a bracket rotatably mounted in close proximity of the cancel cam, and selected among a left turn indicating position, a neutral position, or a right turn indicating position, by operating a turn lever;

at least one pressed portion provided in the bracket;

a moderation mechanism which holds the bracket at the selected positions;

a ratchet body portion adapted to move frontward so that a leading end portion of the ratchet body portion is within the rotational locus of the cancel convex portion, when the bracket is placed at the left turn indicating position or the right turn indicating position, and the ratchet body portion adapted to be turned by the cancel convex portion when the cancel cam is rotated;

a ratchet movable portion provided in a rear part of the ratchet body portion, movable in forward and backward directions of the ratchet body portion, and rotatable with the ratchet body portion, wherein the ratchet movable portion is rotated together with the ratchet body portion and pushes the pressed portion to return the bracket to the neutral position when the ratchet movable portion is rotated in a direction opposite to a direction indicated by the bracket in a state in which the bracket is placed at the left turn indicating position or the right turn indicating position; and a movable portion pushing spring provided between the ratchet movable portion and the ratchet body portion, wherein the movable portion pushing spring permits the ratchet movable portion to move frontward to allow the cancel convex portion to pass therethrough causing a turning force to act on the bracket through the pressed portion in a direction in which the bracket is returned to the neutral position.

With the aforementioned configuration, under ordinary conditions, in a state in which the bracket is placed at the left turn indicating position or the right turn indicating position, when the cancel cam is rotated in a direction opposite to the indicated direction, the ratchet body portion and the ratchet movable portion are turned by the cancel convex portion. Then, the ratchet movable portion pushes the pressed portion to thereby return the bracket to the neutral position. In contrast, at an occurrence of a phenomenon of what is called a grabby brake, in which the turn lever is fixed, the excessive pushing force acting from the ratchet movable portion to the pressed portion is relieved by forward movement of the ratchet movable portion, which is performed against the spring force of the movable portion pushing spring.

In this case, the direction of a vector representing a force transmitted from the ratchet movable portion to the pressed portion of the bracket differs by nearly 90 degrees from the direction of movement of the ratchet movable portion, which is caused so as to relieve an excessive pushing force to be made to act on the pressed portion, or from the direction of expansion and contraction of the movable portion pushing spring. Thus, when a cancel operation is performed, the magnitude of a vector representing a force acting on the movable portion pushing spring is relatively small. Consequently, this force exerts a small influence on the movable portion pushing spring. Therefore, when a cancel operation is performed at the rotation speed of the cancel cam (thus, the rotation speed of the steering wheel) under ordinary driving conditions, the ratchet movable portion is difficult to move. Thus, an occurrence of a cancel error is prevented as much as possible.

According to an embodiment of this turn signal cancel device of the present invention, the ratchet movable portion has a pair of first abutting contact portions adapted to abut against the pressed portion when the bracket is returned to the neutral position, and also has a second abutting contact portion, disposed between the pair of first abutting contact portions and adapted to the pressed portion when the ratchet movable portion frontwardly moves against a spring force of the movable portion pushing spring.

Consequently, when the degree of inclination of the ratchet movable portion with respect to the pressed portion is large, the abutting contact portion to be made to abut the pressed portion changes from each of the first abutting contact portions to the second abutting contact portion. Thus, an engaging area (that is, a region, on which the ratchet movable portion abuts) of the pressed portion can be secured in such a manner as not to have a large area.

DETAILED DESCRIPTION OF THE PREFERRED EMBODIMENT

Hereinafter, an embodiment of the present invention will be described by referring to FIGS. 1 to 7. The configuration of a primary portion of a turn signal cancel device according to this embodiment, which is provided in a steering column of a vehicle, is illustrated in FIG. 2. As shown in FIG. 2, a cancel cam 21 is a cylindrical member, which has a cancel convex portion 1a on the outer peripheral portion thereof, and adapted to be integrally rotated with a steering wheel (not shown). A rotational locus K of a projecting end portion of the cancel convex portion 21a is indicated by a chain double-dashed line.

A rectangular box-like body 22 having opening portions at both lateral end portions is provided in a fixed manner on the right side of this cancel cam 21. A cover (not shown) is attached to the top surface portion of this body 22. Opening portions 22a and 22b are formed in a left-hand side portion and a right-hand side portion, respectively. A bracket 23 is provided in the body 22 in such a way as to be able to rotate around a shaft portion 23a. A base portion of a turn lever 24 is connected to this bracket 23. The turn lever 24 projects to the right-hand side from the opening portion 22b.

A moderation surface portion 25 having alternate formed ridge portions 25a and valley portions 25b is provided on the left-hand inner surface of the body 22. A moderation piece 26 pushed by a moderation spring 27a in a direction, in which the moderation piece 26 is press-contacted with the moderation surface portion 25, is provided at the leading end portion of the bracket 23. A known moderation mechanism 27 includes the moderation surface portion 25, the moderation spring 27a, and the moderation piece 26.

Thus, the bracket 23 and also the turn lever 24 are held selectively at a neutral position shown in FIG. 2, a left turn indicating position (see FIG. 1) to which the turn lever 24 is turned therefrom in a direction of an arrow A1, and a right turn indicating position (not shown) to which the turn lever 24 is turned therefrom in a direction of an arrow A2 whose direction is opposite to the arrow A1. Incidentally, although not shown, a turn signal switch, whose contacts are switched according to the position of the bracket 23, is provided in the body 22.

Further, a cam portion 28 having a crest part is provided on a front-side part (that is, a part at the side of the cancel cam 21) of the top surface portion of the bracket 23. Two convex portions 30 each having a pressed portion 29 is provided at the right side of this cam portion 28. When viewed from above, each of the convex portions 30 is shaped like a rectangular triangle. A part corresponding to the oblique side of the rectangular triangle is used as the pressed portion 29.

Figure 3:
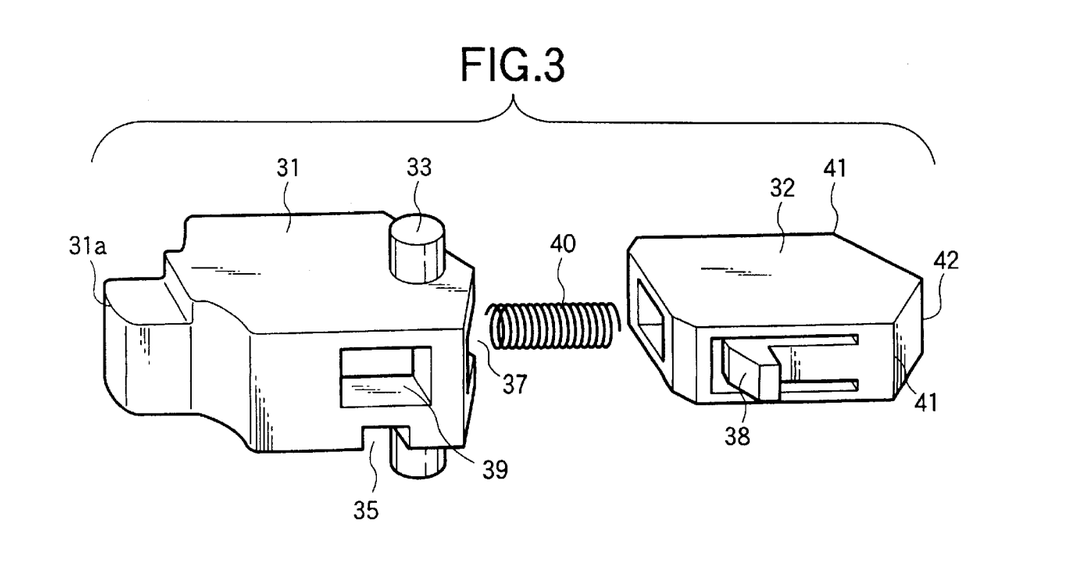
FIG. 3 is an exploded perspective diagram of a ratchet body portion, a ratchet movable portion, and a movable portion pushing spring.

A ratchet body portion 31 and a ratchet movable portion 32 are disposed in the top surface portion of the bracket 23. A shaft portion 33 protruding upwardly and downwardly from the ratchet body portion 31 is provided on a rearward portion of the ratchet body portion 31, as illustrated in FIG. 3. The top end part of the shaft portion 33 is movably and rotatably inserted into a guide hole 34 formed in the cover (not shown) as an elongated hole. The bottom part of the shaft portion 33 is provided so as to move along the cam portion 10. A spring engaging groove portion 35 is formed in the lower part of the ratchet body portion 31. This ratchet body portion 31 is pushed in the direction of the arrow C (that is, to the side of the cancel cam 21) by a ratchet pushing spring 36, which is engaged with the engaging groove portion 35. The leading end portion 31a leftwardly projects from the opening portion 22a, as viewed in this figure. Both end portions of the ratchet pushing spring 36 are supported by the body 22.

Figure 4:
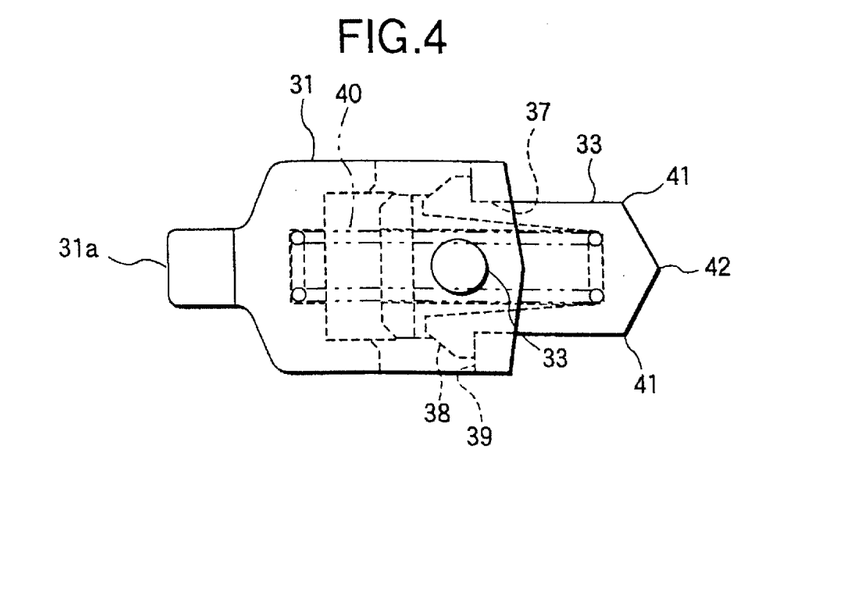
FIG. 4 is a plan diagram illustrating a state in which a movable portion pushing spring and the ratchet movable portion are incorporated into the ratchet body.

A storage portion 37 opened in the back thereof is formed in the ratchet body portion 31. As illustrated in FIG. 4, the front portion of the ratchet movable portion 32 is accommodated in this storage portion 37 in such a way as to be able to move in the front and rear directions of the ratchet body portion 31. The rear portion of the ratchet movable portion 32 backwardly projects therefrom. The ratchet movable portion 32 is attached to the ratchet body portion 31 by engaging each of elastic engaging claws with a corresponding one of engaging holes 39 formed in the ratchet body portion 31 so that the ratchet movable portion 32 is prevented from slipping off from the ratchet body portion 31. Therefore, the ratchet movable portion 32 is provided therein in such a way as to be placed between the pair of the pressed portions 29, and as to be able to move in the front and rear directions of the ratchet body portion 31 in the rear portion thereof, and as to be rotated together with the ratchet body portion 31.

A movable portion pushing spring 40 constituted by a coil spring is disposed between the ratchet body portion 31 and the ratchet movable portion 32. Under ordinary conditions, the ratchet movable portion 32 is rearwardly pushed by the spring force of this movable portion pushing spring 40. A rear portion of the ratchet movable portion 32 is formed like a chevron. Corner parts provided at both sides of the ratchet movable portion 32 are used as a pair of first abutting contact portions 41. A central rear end portion disposed between the pair of first abutting contact portions 41 is used as a second abutting contact portion 42.

Next, an operation of the device of the aforementioned configuration is described hereinafter. In a state in which the bracket 23 (thus, the turn lever 24) is placed at the neutral position illustrated in FIG. 2, the bottom part of the shaft portion 33 of the ratchet body portion 31 is placed at the top of the crest part of the cam portion 28. The ratchet body portion 31 is held at a position where the leading end portion 31a thereof retreats from the rotational locus K of the cancel convex portion 21a.

Figure 1:
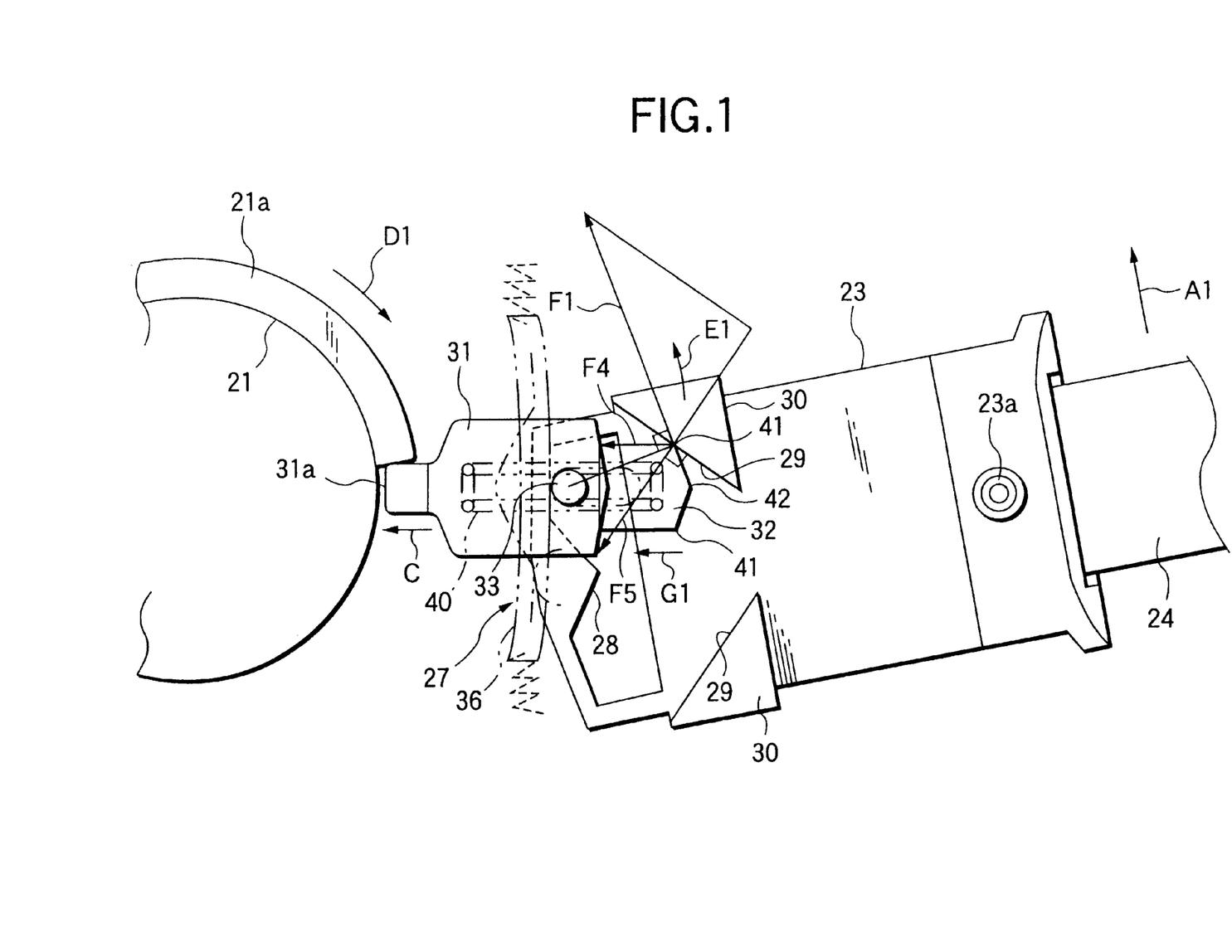
FIG. 1 is a primary portion of an embodiment of the present invention, for illustrating a cancel operation performed in a state in which a bracket is at a left turn indicating position.
Figure 2:
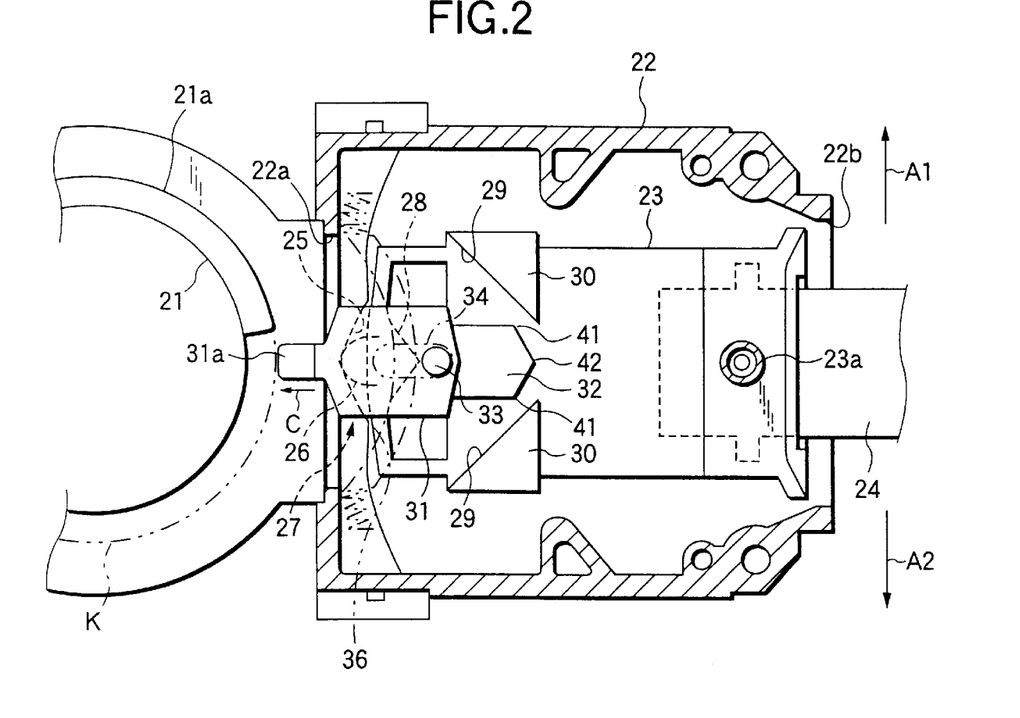
FIG. 2 is a transverse sectional plan diagram illustrating a state in which the bracket is at a neutral position.

When the turn lever 24 is turned from this neutral position thereof in the direction of, for instance, the arrow A1, and the bracket 23 is placed at the left turn indicating position illustrated in FIG. 1, the ratchet body portion 31 and the ratchet movable portion 32 are caused by the pushing force of the ratchet pushing spring 36 to frontwardly move in the direction of the arrow C during the bottom part of the shaft portion 33 moves along a slope of the cam portion 28. Then, the ratchet body portion 31 is put into a state in which the leading end portion 31a thereof moves into the rotational lotus K of the cancel convex portion 21a.

Figure 5:
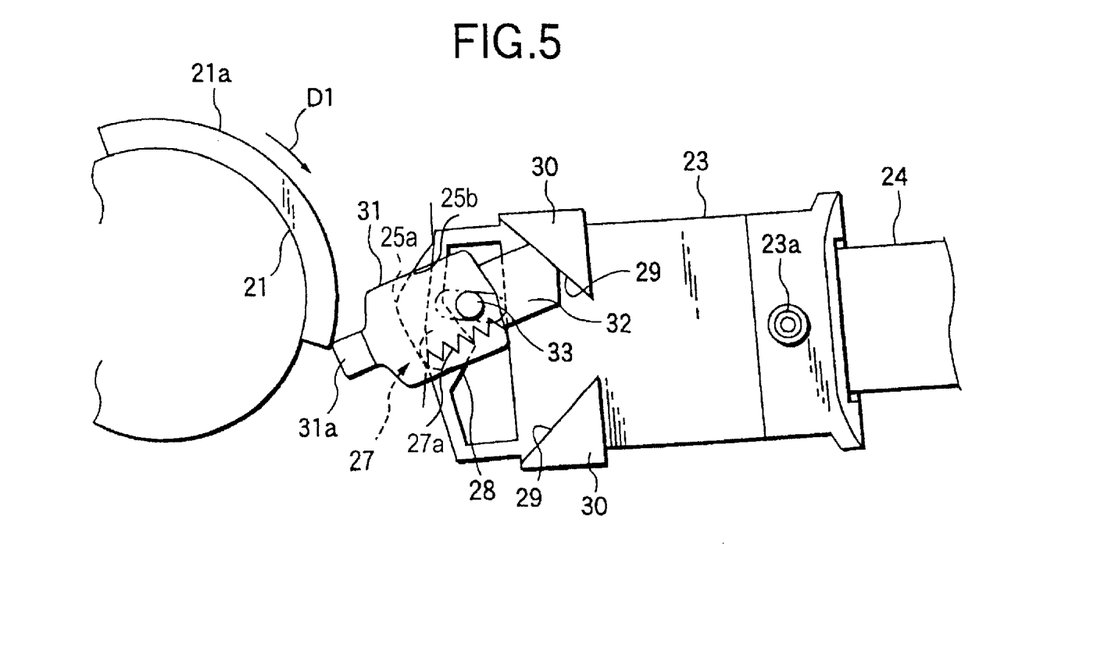
FIG. 5 is a plan diagram of the primary portion, which illustrates a state thereof just before the bracket is turned from the left turn indicating position to the neutral position.

When the cancel cam 21 is turned in the direction of the arrow D1, which is opposite to the indicated direction of the bracket 23, by the steering wheel during this state, the leading end portion 31a of the ratchet body portion 31 is pushed in the same direction by the cancel convex portion 21a as illustrated in FIG. 1, so that the ratchet body portion 31 and the ratchet movable portion 32 are turned around the shaft portion 33 in the direction of the arrow E1, and that one of the first abutting contact portions 41 of the ratchet movable portion 32 pushes a corresponding one of the pressed portions 29. In the case that this pushing force exceeds the holding force of the moderation mechanism 27, the bracket 23 (thus, the turn lever 24) is turned and returned to the neutral position (see FIG. 2). FIG. 5 illustrates a state of the device just before the bracket 23 (thus, the turn lever 24) is turned from the left turn indicating position to the neutral position.

Figure 6:
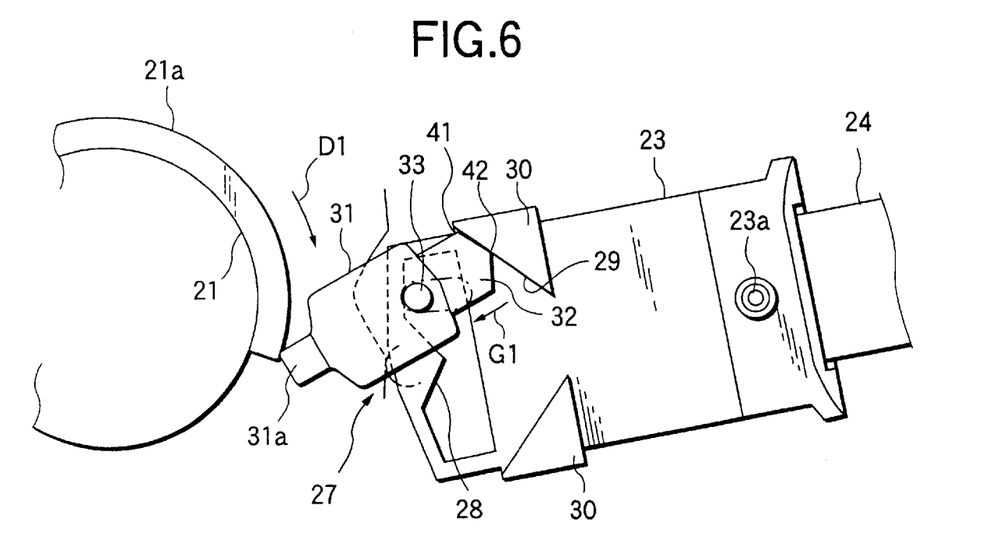
FIG. 6 is a plan diagram of the primary portion, which illustrates a state in which a cancel convex portion is permitted to pass when the bracket is fixed at the left turn indicating position (that is, when a phenomenon of a grabby brake occurs).

Meanwhile, in the case that a phenomenon of what is called a grabby brake occurs, for example, the turn lever 4 is held by a driver at the left turn indicating position when the cancel operation is performed, an excessive pushing force acts on the pressed portion 29 from the ratchet movable portion 32. Then, as illustrated in FIG. 6, the ratchet movable portion 32 moves to the front of the ratchet body portion 31 (that is, in the direction of the arrow G1) against the spring force of the movable portion pushing spring 40. Thus, the movable portion pushing spring 40 permits the ratchet movable portion 32 to move frontwardly (namely, in the direction of the arrow G1) and allows the cancel convex portion 21a to pass therethrough in the direction of the arrow D1. At that time, the second abutting contact portion 42 of the ratchet movable portion 32 abuts against the pressed portion 29.

Incidentally, although the aforementioned operation is performed when the bracket 23 (thus, the turn lever 24) is turned to the left turn indicating position, a similar operation is performed when the bracket 23 (thus, the turn lever 24) is turned to the right turn indicating position.

Additionally, let F1 denote a vector representing the pushing force transmitted from the ratchet movable portion 32 to the pressed portion 29 of the bracket 23 when the cancel operation is performed as illustrated in FIG. 1. In this case, a vector F4 representing a force acting on the movable portion pushing spring 40 for relieving the excessive force generated at an occurrence of a phenomenon of what is called a grabby brake is established as illustrated in FIG. 1. Incidentally, in this figure, a vector F5 is a vector representing a vertical reaction force transmitted from the pressed portion 29 to the ratchet movable portion 32.

In this case, the direction of the vector F1 representing the force transmitted from the ratchet movable portion 32 to the pressed portion 29 differs by nearly 90 degrees from the direction of expansion and contraction of the movable portion pushing spring 40 (or the direction of the arrow G1, that is, the direction of movement of the ratchet movable portion 32). Thus, when a cancel operation is performed, the magnitude of the vector F4 representing the force acting on the movable portion pushing spring 40 is small in comparison with the magnitude of the vector F2 representing the force acting on the back-plate holding spring 9 (F4<F2) Consequently, a small influence is exerted on the movable portion pushing spring 40.

Figure 7:
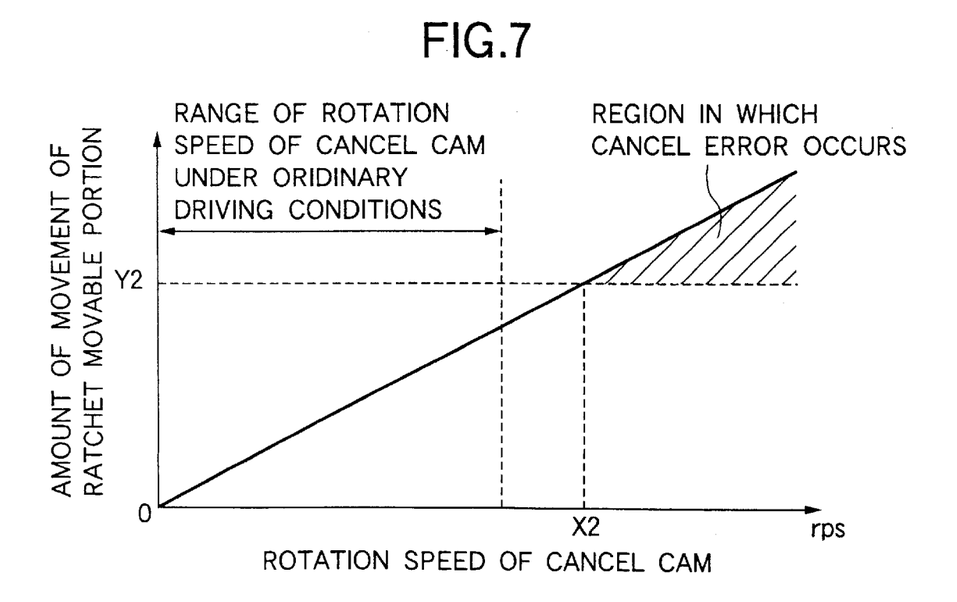
FIG. 7 is a diagram illustrating the relation between the rotation speed of a cancel cam and the amount of movement of the ratchet movable portion.

Therefore, as illustrated in FIG. 7, when a cancel operation is performed at the rotation speed of the cancel cam (thus, the rotation speed of the steering wheel) under ordinary driving conditions, the ratchet movable portion 3 is difficult to move. Thus, an occurrence of a cancel error is prevented as much as possible.

Further, in the case of the aforementioned embodiment, when the degree of inclination of the ratchet movable portion 32 with respect to the pressed portion 29 is large, the abutting contact portion to be made to abut the pressed portion 29 changes from the first abutting contact portion 41 to the second abutting contact portion 42. Thus, an engaging area (that is, a region, on which the ratchet movable portion 32 abuts) of the pressed portion 29 can be secured in such a manner as not to have a large area.

As is apparent from the foregoing description, in the case of the device of the present invention, the direction of a vector representing a force transmitted from the ratchet movable portion to the pressed portion of the bracket largely differs from the direction of movement of the ratchet movable portion, which is caused so as to relieve the excessive pushing force to be made to act on the pressed portion, or from the direction of expansion and contraction of the movable portion pushing spring. Thus, the magnitude of a vector representing a force acting on the movable portion spring is relatively small. Consequently, this force exerts a small influence on the movable portion pushing spring. Therefore, when a cancel operation is performed at the ordinary rotation speed of the cancel cam (thus, the ordinary rotation speed of the steering wheel), the ratchet movable portion is difficult to move. Thus, an occurrence of a cancel error is prevented as much as possible.

What is claimed is:

1. A turn signal cancel device comprising:
 a cancel cam having a cancel convex portion defining a rotational locus adapted to be rotated by a steering wheel;
 a bracket rotatably mounted in close proximity of said cancel cam, and selected among a left turn indicating position, a neutral position, or a right turn indicating position, by operating a turn lever;
 at least one pressed portion provided in said bracket;
 a moderation mechanism which holds said bracket at said selected positions;
 a ratchet body portion adapted to move frontward so that a leading end portion of said ratchet body portion is within the rotational locus of the cancel convex portion, when said bracket is placed at said left turn indicating position or said right turn indicating position, and said ratchet body portion adapted to be turned by said cancel convex portion when said cancel cam is rotated;
 a ratchet movable portion provided in a rear part of said ratchet body portion, movable in forward and backward directions of said ratchet body portion, and rotatable with said ratchet body portion, wherein said ratchet movable portion is rotated together with said ratchet body portion and pushes said pressed portion to return said bracket to said neutral position when said ratchet movable portion is rotated in a direction opposite to a direction indicated by said bracket in a state in which said bracket is placed at said left turn indicating position or said right turn indicating position; and
 a movable portion pushing spring provided between said ratchet movable portion and said ratchet body portion, wherein said movable portion pushing spring permits said ratchet movable portion to move frontward to allow said cancel convex portion to pass therethrough causing a turning force to act on said bracket through said pressed portion in a direction in which said bracket is returned to said neutral position.

2. A turn signal cancel device according to claim 1, wherein said ratchet movable portion includes a pair of first abutting contact portions abutting against said at least one pressed portion when said bracket is returned to said neutral position, and a second abutting contact portion disposed between said pair of first abutting contact portions and abutting against said at least one pressed portion when said ratchet movable portion moves frontward against a spring force of said movable portion pushing spring.

3. A turn signal cancel device according to claim 1, wherein said moderation mechanism includes a moderation surface portion having at least ridge portion and valley portion, a moderation piece provided at said bracket, and a moderation spring pushing said moderation piece toward said moderation surface portion, so that said moderation piece is pressed with said moderation surface portion.

* * * * *